H. C. PHIPPS.
SUGAR BEET TOPPER AND PULLER.
APPLICATION FILED JUNE 22, 1915.

1,176,850.

Patented Mar. 28, 1916.
3 SHEETS—SHEET 1.

Witnesses

Inventor
H. C. Phipps
By Victor J. Evans
Attorney

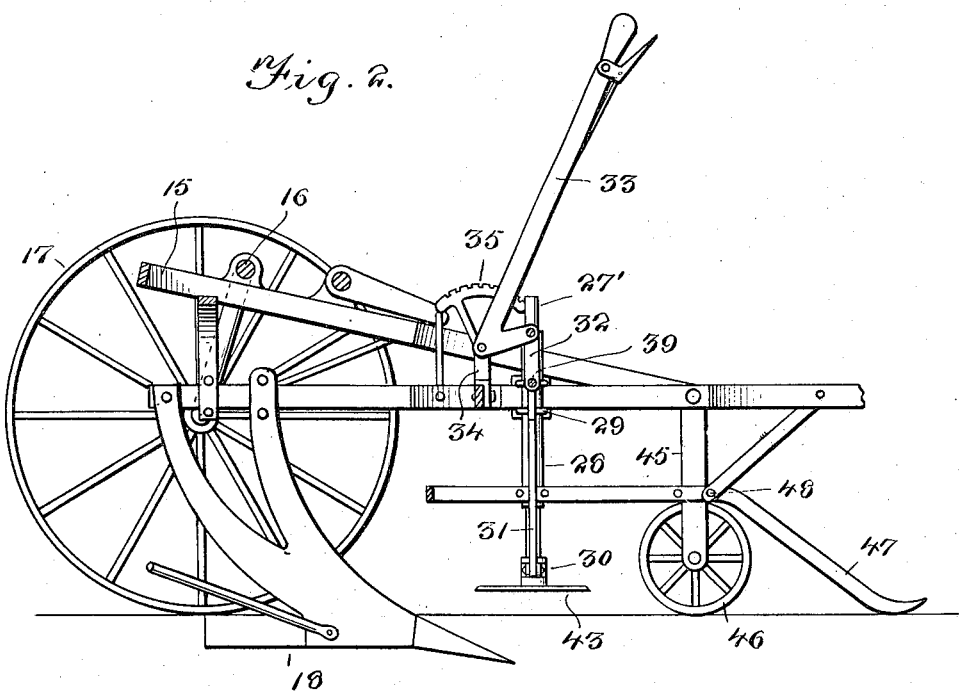
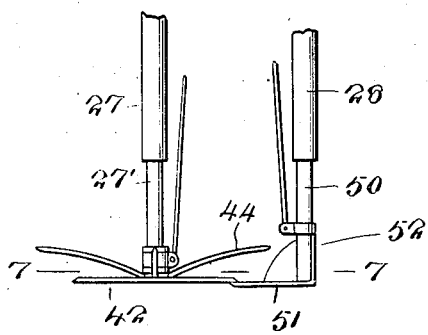
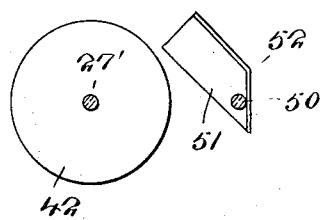

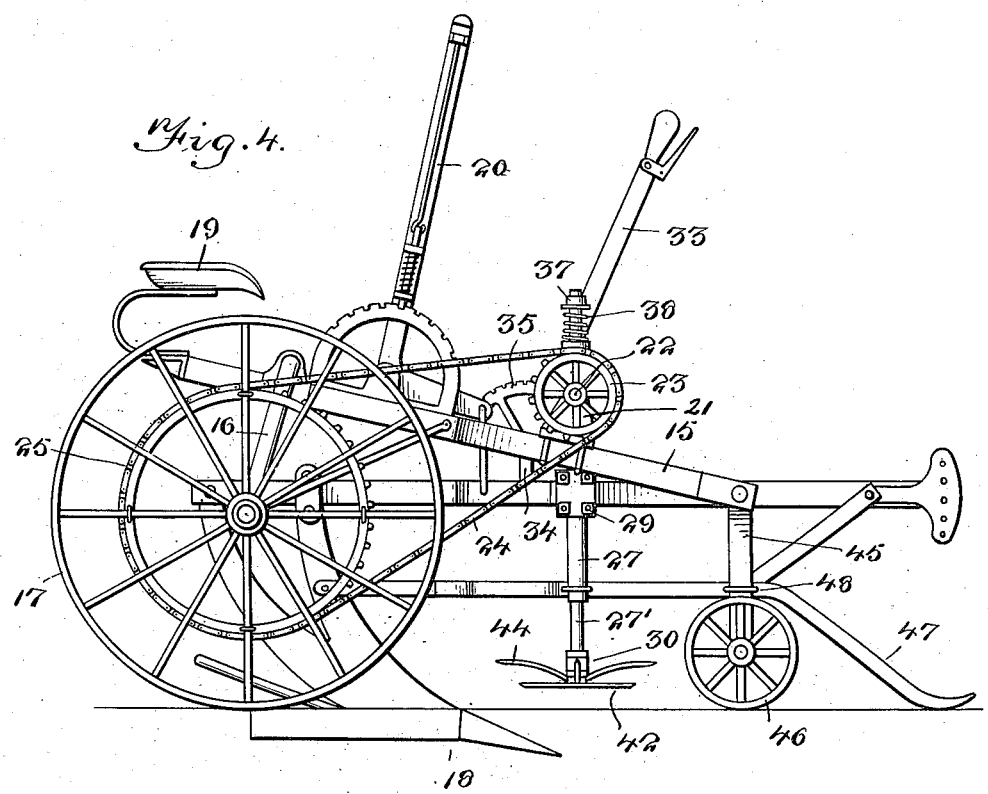

UNITED STATES PATENT OFFICE.

HENRY C. PHIPPS, OF FREMONT, NEBRASKA.

SUGAR-BEET TOPPER AND PULLER.

1,176,850.  Specification of Letters Patent.  Patented Mar. 28, 1916.

Application filed June 22, 1915. Serial No. 35,619.

*To all whom it may concern:*

Be it known that I, HENRY C. PHIPPS, a citizen of the United States, residing at Fremont, in the county of Dodge and State of Nebraska, have invented new and useful Improvements in Sugar-Beet Toppers and Pullers, of which the following is a specification.

This invention relates to a beet harvester of that class in which the beet roots are pulled or extracted from the ground by digging or lifting elements which are spaced apart so as to engage the two sides of the beet root.

The present invention has for its prime object to produce a topping device which may be readily applied to and used in connection with beet pullers of ordinary or conventional construction.

A further object of the invention is to produce co-acting knives or cutters which will serve to sever the top of the beet, said cutters being mounted for rotation, and one cutter being provided with arms whereby the beet tops will be thrown to one side, out of the way of the machine.

A further object of the invention is to produce simple and effective means for effecting vertical adjustment of the cutters so that the beet tops will be severed at the proper point, regardless of the extent to which the beet roots may project above the ground.

With these and other ends in view which will readily appear as the nature of the invention is better understood, the same consists in the improved construction, arrangement and combination of parts which will be hereinafter fully described and particularly pointed out in the claims.

In the accompanying drawings has been illustrated a simple and preferable form of the invention, it being, however, understood that no limitation is necessarily made to the precise structural details therein exhibited but that changes, alterations and modifications within the scope of the appended claims may be resorted to when desired.

Figure 1:
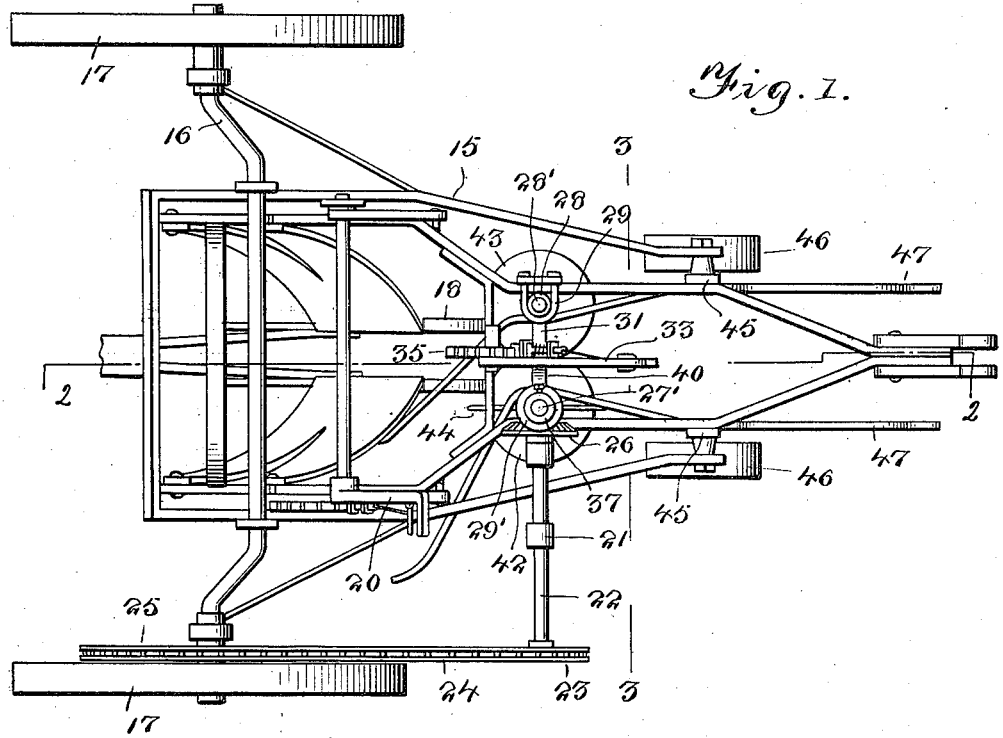
Figure 3:
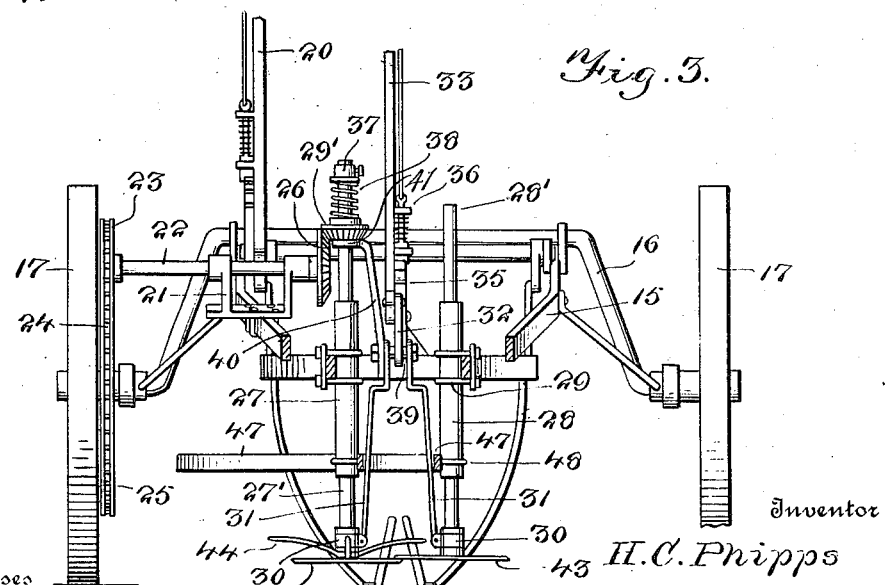

In the drawings, Figure 1 is a top plan view of a beet harvester embodying the invention. Fig. 2 is a longitudinal sectional view taken on the line 2—2 in Fig. 1. Fig. 3, is a transverse sectional view taken on the line 3—3 in Fig. 1. Fig. 4 is a side elevation. Fig. 5 is a detail front view showing cutting disks in place of the truck wheels shown in the preceding figures. Fig. 6 is a detail view in front elevation showing a modified construction of the cutting mechanism. Fig. 7 is a horizontal sectional view taken on the line 7—7 in Fig. 6.

Corresponding parts in the several figures are designated by like characters of reference.

The main frame 15 which is equipped with an arched axle 16 having ground wheels 17, and which carries the digging or lifting elements 18, the driver's seat 19, and the adjusting lever 20 is of a well known and conventional construction.

Rigidly mounted on the main frame 15 are standards 21 affording bearings for the shaft 22 which is substantially parallel to the axle, said shaft carrying a sprocket wheel 23 which is connected by a driving chain 24 with the sprocket wheel 25 mounted on one of the ground wheels. The shaft 22 carries at one end a bevel gear 26, said shaft, when the machine is in operation being constantly driven by the ground wheel.

Securely connected with parts of the main frame 15 are vertically disposed sleeves 27, 28 said sleeves being securely but detachably connected with the frame by fastening means such as clips 29. Fitted in said sleeves for rotation therein and also for vertical slidable movement are shafts 27' 28' one of which, 27' is provided with a bevel pinion 29' meshing with the bevel gear 26. The shafts 27' 28' are provided near their lower ends with collars 30, said collars being connected by rods 31, with one end of a link 32, the other end of which is connected with one arm of a lever 33 fulcrumed on a stand 34 having a rack segment 35 which is engaged by a stop member 36 carried by the lever whereby said lever and related parts may be retained securely at various adjustments. The pinion 29' is slidable on the shaft 27' which latter is provided at its upper end with a flange or collar 37 between which and the pinion is arranged a coiled spring 38 whereby the pinion is normally held in mesh with the bevel gear 26. Pivotally mounted on the pin or pivot member 39 which connects the link 32 with the upper ends of the rods 31 is a bracket 40 having a terminal fork 41 that straddles and engages the shaft 27' below the pinion 29'. The parts are so arranged and proportioned that when the pinion 29' is in mesh with the beveled gear 26 the shafts 27' 28' will be free to be moved vertically in their respective bearing sleeves by the means provided for the purpose, the downward movement causing obviously a compression of the spring. On the other hand, by manipulation of the lever 33, the shafts 27', 28' may be lifted above a point at which the pinion 29' meshes with the bevel gear 26, the pinion being lifted out of enmeshment with the bevel gear by the forked bracket 40.

The shafts 27' 28' are provided at their lower end with cutter members which may be in the nature of disks 42, 43 which are placed in overlapping relation. The disk 42 associated with the shaft 27' will be positively driven while the disk 43 associated with the shaft 28' will operate as an idler. The hub of the positively driven disk 42 is provided with radially extending arms or prongs 44 which when the machine is in operation serve to throw the severed tops to one side.

The forward end of the main frame is provided with downwardly extending standards 45 which may be utilized for carrying truck wheels 46 or cutting disks 47', the latter, when used, serving to loosen the soil adjacent to the row of beets, thereby facilitating the extraction of the roots. Guides or gathering members 47 have been shown as being mounted by means of clips or clamps 48 on the standards 45 and on the bearing sleeves 27, 28 said guides serving to gather the leafy tops of the beets and to guide them to the cutting apparatus.

In Figs. 6 and 7 of the drawings has been illustrated a slightly modified form of the cutting apparatus. Under the construction here shown the shaft mounted in the sleeve 28, and which here is designated as 50, is arranged non-rotatably in the bearing sleeve in which however it is free to move vertically. The shaft 50 carries at its lower end a stationary shear 51 which is reinforced by a fin or flange 52 and which coöperates with the cutter 42 as will be readily understood.

From the foregoing description taken in connection with the drawings hereto annexed the operation and the advantages of this invention will be readily understood by those skilled in the art to which it appertains.

The improved topping device is simple in construction and is capable of being readily applied to a conventional beet lifter or beet puller with the result that the beets will be topped before being extracted from the ground. By means of the hand lever 33 the operator may readily adjust the cutting mechanism so as to sever the beet tops at any desired distance above the ground and by further manipulating said lever the shafts carrying the cutting mechanism may be lifted to a position where the transmission of motion from the ground wheel to the cutter carrying shaft will be interrupted, thus making the machine convenient for transportation as well as for turning at the ends of the rows.

Having thus described the invention what is claimed is:—

1. In a beet harvester a wheel supported frame having beet lifting elements, bearing sleeves carried by the frame, cutter carrying shafts slidable in the bearing sleeves, a pinion slidable on and rotatable with one of the cutter carrying shafts, a stop member at the upper end of the shaft, a spring coiled between the stop member and the pinion to force the latter downwardly on the shaft, a driven shaft mounted on the frame and having a bevel gear meshing with the pinion and means for effecting adjustment of the cutter carrying shafts in their respective bearing sleeves.

2. In a beet harvester a wheel supported frame having beet lifting elements, a counter shaft supported on the frame said shaft having a bevel gear at one end, means for driving the countershaft, vertical bearing sleeves secured on the frame, cutter carrying shafts slidable in the bearing sleeves, a slidable spring actuated pinion on one of the cutter carrying shafts meshing with the bevel gear on the countershaft, collars on the cutter carrying shafts, a lever, a link connected with one arm thereof, rods connecting the collars with the link, and a bracket pivotally connected with the link and having a terminal fork straddling the shaft to lift the pinion to non-meshing position with respect to the bevel gear on upward movement of the bracket.

3. In a beet harvester, a pair of cutter carrying shafts supported for vertical slidable movement, one of said shafts being also supported for rotation, means for driving the rotary shaft including a driven pinion, a pinion slidable on the shaft and adapted to mesh with the driven pinion, a spring normally pressing the slidable pinion in engagement with the driven pinion, means for vertically adjusting the shafts including a lever and a connecting link, and a bracket pivotally connected with the link and having a fork supporting the slidable pinion which may thereby be lifted against the tension of the spring out of engagement with the driven pinion.

4. In a beet harvester a wheel supported main frame having standards at the front end thereof, bearing sleeves securely connected with the frame, cutter carrying shafts mounted in said sleeves and gathering members clamped on the standard and the bearing sleeves to guide the tops to the cutting apparatus.

In testimony whereof I affix my signature in presence of two witnesses.

HENRY C. PHIPPS.

Witnesses:
J. K. LEWIS,
J. D. SAWYER.